United States Patent [19]

Peterpaul

[11] Patent Number: 4,761,086

[45] Date of Patent: Aug. 2, 1988

[54] SUPPORT DEVICE FOR WIRE MARKER SLEEVES

[75] Inventor: Joseph Peterpaul, Neshanic Station, N.J.

[73] Assignee: Thomas & Betts Corporation, Bridgewater, N.J.

[21] Appl. No.: 867,360

[22] Filed: May 23, 1986

[51] Int. Cl.[4] ........................ B41J 13/12; B65D 85/20; B23G 3/00

[52] U.S. Cl. ........................................ 400/531; 101/35; 206/345; 269/47

[58] Field of Search .................. 400/14, 128, 521, 522, 400/531, 532, 533, 534, 537, 617, 634, 635, 662; 229/69; 282/11.5 R, 11.5 A; 269/47; 283/1 R; 101/4, 35; 29/33 E; 206/345, 347, 390, 485

[56] References Cited

U.S. PATENT DOCUMENTS

| | | | |
|---|---|---|---|
| 1,480,440 | 1/1924 | Hardman | 400/522 |
| 1,555,104 | 9/1925 | Corcoran | 400/662 |
| 1,886,476 | 11/1932 | Gabrielson | 400/532 X |
| 1,992,017 | 2/1935 | Spielvogel | 400/14 X |
| 2,818,155 | 1/1955 | Kizak | 400/238 |
| 3,293,682 | 7/1986 | Giles | 15/210 |
| 3,773,276 | 11/1973 | Ganske | 242/192 |
| 3,804,226 | 4/1974 | Ellis | 400/531 |
| 3,894,731 | 7/1975 | Evans | 269/47 |
| 3,955,777 | 5/1976 | Burdorf | 242/192 |
| 3,985,852 | 10/1976 | Evans | 400/522 X |
| 4,032,010 | 6/1977 | Evans | 206/390 X |
| 4,206,909 | 6/1980 | Wintle | 269/47 |
| 4,333,619 | 6/1986 | Schoettle et al. | 242/195 |
| 4,361,230 | 11/1982 | Downing et al. | 206/345 |
| 4,363,401 | 12/1982 | Savagian | 206/345 |
| 4,488,642 | 12/1984 | Changani et al. | 206/345 |
| 4,586,610 | 5/1986 | Gandolfo | 206/485 |
| 4,636,099 | 1/1987 | Goldstone | 400/531 |

FOREIGN PATENT DOCUMENTS

| | | | |
|---|---|---|---|
| 1065432 | 9/1959 | Fed. Rep. of Germany | 400/531 |
| 2255550 | 5/1974 | Fed. Rep. of Germany . | |
| 0131277 | 7/1985 | Japan | 400/531 |
| 185975 | 11/1936 | Switzerland | 400/531 |
| 1244539 | 9/1971 | United Kingdom . | |

*Primary Examiner*—Ernest T. Wright, Jr.

*Attorney, Agent, or Firm*—Robert M. Rodrick; Salvatore J. Abbruzzese

[57] ABSTRACT

A device for supporting plural wire markers is disclosed. A support card supports members for insertion into a typewriter or computer printer. The support card includes a frictional engagement means for engaging the platen of the typewriter or computer printer to frictionally support the card therein.

7 Claims, 2 Drawing Sheets

SUPPORT DEVICE FOR WIRE MARKER SLEEVES

FIELD OF THE INVENTION

This invention relates generally to a device for supporting plural sleeves for marking electrical wires and more particularly relates to a support sheet which carries plural wire marker sleeves for insertion around a platen of a typewriter or computer printer for printing indicia thereon.

BACKGROUND OF THE INVENTION

In the field of markers for electrical wires it is known to use substantially flattened markers in a plural array on some type of support device. The support device is insertable around a platen of a typewriter or a computer printer. This permits the markers to be printed with indicia thereon for subsequent removal or detachment from the support device and insertion over a electrical wire or cable. A wire marker sleeve and support assembly therefore of this type is shown and described in commonly assigned U.S. Pat. No. 4,586,610 issued May 6, 1986. While this device adequately provides an assembly of sleeves on a support card or web for placement in a typewriter or computer printer it has been found that there is a tendency for the assembly to slip or otherwise become misaligned when placed around the platen of a typewriter or computer printer. It has been further found that excess movement of the support device around the platen may also tend to dislodge the wire markers held thereon. It is, therefore, desirable to provide a superior wire marker support member which may be securely positioned around the platen of a typewriter or computer printer and which will support the sleeves thereon during the printing process.

SUMMARY OF THE INVENTION

It is an object of the present invention to provide a wire marker support assembly which supports plural wire marker sleeves thereon.

It is a further object of the present invention to provide a wire marker sleeve assembly which frictionally engages the platen to a typewriter or computer printer for securely positioning the card therearound.

In the efficient attainment of the foregoing and other objects the present invention looks toward providing a wire marker support device including a flat support member capable of being inserted around the platen of a printing device. The planar member includes supporting means for supporting plural markers thereon. Also included are platen engagement means extending from the planar member which frictionally engage the platen of the printing device to provide positional securement of the support device around the platen. The device shown by way of the preferred embodiment herein includes a substantially planar support card including inwardly extending tabs for holding opposite ends of the wire marker sleeve. Rib means are included in longitudinally extending fashion along the flat support card which extend outwardly therefrom to frictionally engage the platen of the typewriter or printing device. This provides sufficient traction to hold the card in positional confinement around the platen.

DETAILED DESCRIPTION OF THE PREFERRED EMBODIMENT

Figure 1:
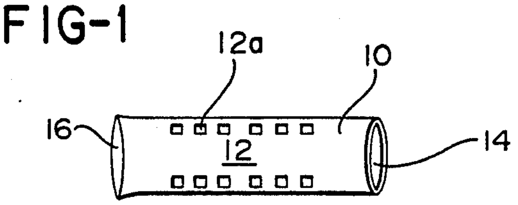
FIG. 1 shows in front perspective view a wire marker sleeve used in accordance with the present invention.

The present invention provides a support device for securing plural wire marker sleeves such as sleeve 10 shown in FIG. 1.

As used in the present invention, sleeve 10 is of the type having a substantially flattened central extent 12 and unflattened end extents 14 and 16 on either side thereof. The sleeve 10 is formed from a tube which is cut into desired lengths. Upon flattening the central extent 12, the unflattened extents 14 and 16 remain somewhat tubular. The flattening may be achieved by placing spaced welds 12*a* along portion 12. The sleeve 10 and the method of manufacturing the same is shown and described in detail in commonly assigned U.S. Pat. No. 4,586,610. In order to print indicia on flattened portion 12 of sleeve 10 plural sleeves 10 are supported on a support device for insertion around the platen of a typewriter or computer printer.

Figure 2:
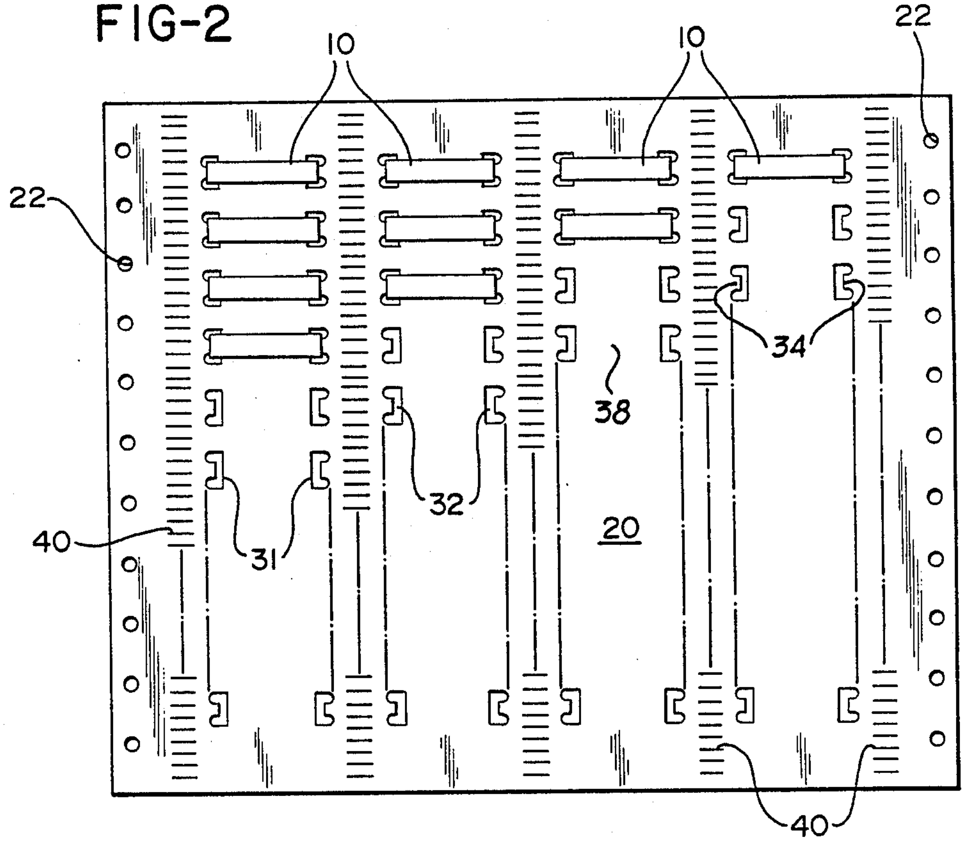
FIG. 2 shows the support card of the present invention including wire markers inserted thereon.

Referring to FIG. 2, a plurality of individual sleeves 10 are shown mounted on a support card or carrier web 20. Carrier web 20 is a rectangular flat sheet which may be formed of paper, plastic or other suitably bendable material. Carrier web 20 may be opaque or translucent depending on the material employed. Carrier web 20 is preferably formed in a single sheet, however, continuous fan folded sheets are also contemplated. In the fan folded embodiment carrier web 20 may also include plural holes 22 along each longitudinal side thereof so that it may be inserted around the platen of an electronic data processor (EDP) (not shown) having an alignment mechanism for engaging holes 22. The fan folded embodiment may be formed in a fashion similar for EDP paper.

Figure 3:
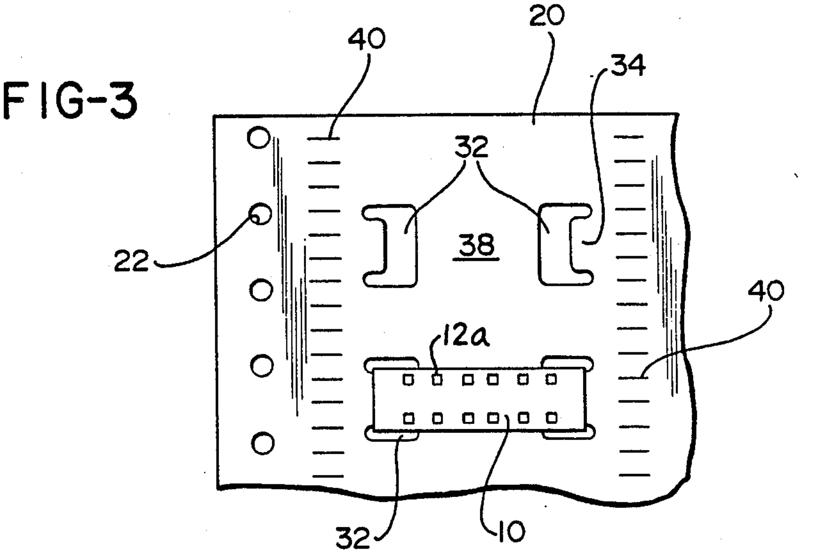
FIG. 3 is a fragmented showing of a portion of the support card of FIG. 2.

Each web 20 further includes plural dual rows 31 of die-cut punched-out openings 32 extending longitudinally therealong. Referring additionally to FIG. 3, each opening 32 is bounded by a portion of web 20 formed into an inwardly directed tab member 34 which extends into opening 32. The tab member 34 of adjacent openings 32 of each pair of dual rows 31 are inwardly directed to support thereinbetween sleeve 10. The tab member 34 is insertable into the unflattened end extents 14 and 16 of sleeve 10 and frictionally engage the sleeve 10 to support it on web 20.

Between dual openings 32 is a central solid portion 38 of web 20 which provides a backing for the wire marker sleeve 10 inserted therein. This backing 38 helps retain the sleeve 10 on the carrier web 20. Also, this backing 38 provides a suitable support as the wire marker sleeve 10 is being imprinted in a typewriter or computer printing device. Openings 32 are positioned and dimensioned to accommodate the tubular sleeves 10 in frictional engagement. The inwardly extending tabs 34 and the backing 38 help to support the sleeves 10 on carrier web 20 as the web 20 is wrapped around the platen of the typewriter or computer printing device.

Referring again to FIG. 2, between each pair of longitudinally extending rows 31 of openings 32 is a longitudinal row of raised members 40. Each longitudinal row of raised members 40 forms a ribbed platen engagement means. The raised members 40 may be molded with the carrier web 20 and are raised from each planar side thereof to provide increased traction when the carrier web 20 is inserted around the platen of the typewriter or computer printing device.

Figure 4:
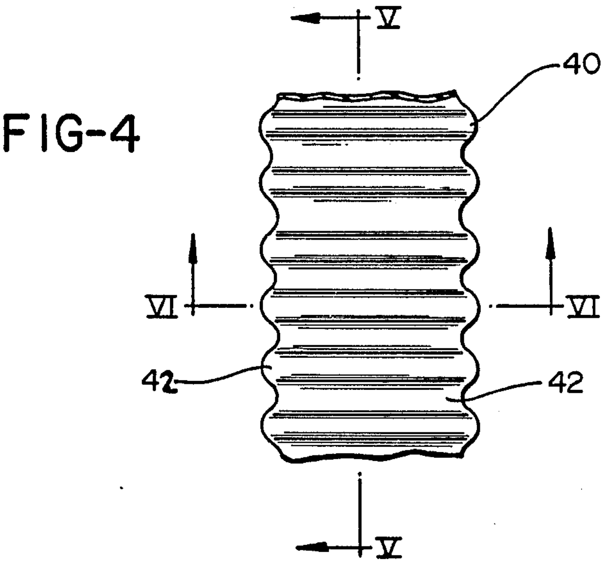
FIG. 4 is an enlarged detail showing of a portion of the support card of FIG. 2.
Figure 5:
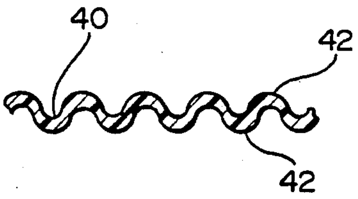
FIG. 5 is a sectional showing of the support card of FIG. 4 taken through section line V—V thereof.
Figure 6:
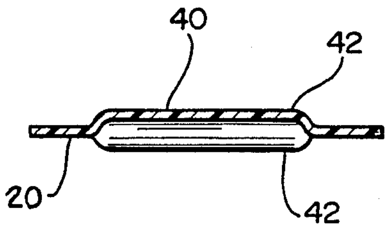
FIG. 6 is a sectional showing of the support card of FIG. 4, taken through section line VI—VI.

Referring in more detail in FIGS. 4, 5 and 6, the raised members 40 are shown. Raised members 40 take the form of corrugations or undulations 42 which are raised from either side of the flat carrier web 20. While the carrier web 20 has a thickness of approximately 0.0075 inches, the raised members 40 extend approximately 0.030 inches above and below the surface of the web 20. The raised undulations 42 are preferably placed at a pitch of 0.080 inches. These dimensions provide for maximum traction of the web 20 around the platen of the typewriter or computer printing device yet allow for easy insertion and removal thereof. Raised members 40 are positioned longitudinally along web 20 extending in the direction of insertion and removal of web 20 from the typewriter or computer printer. This permits the web 20 to be readily flexed in the longitudinal direction for ease of insertion and removal.

In addition, the raised members 40 extend outwardly a distance which approximates the outward extent of the unflattened extents 14 and 16 of sleeve 10. This provides a substantially smooth transition between the planar portion of web 20 and the portion 38 supporting sleeve 10. Thus, as the printing device scans horizontally across the web 20, it will not encounter an abrupt bump upon contact with the individual sleeves 10.

Various changes to the foregoing described and shown structures would now be evident to those skilled in the art. Accordingly, the particularly disclosed scope of the invention is set forth in the following claims.

I claim:

1. In combination, a plurality of wire marker sleeves and a support device therefor comprising:

a plurality of elongate wire marker sleeves having opposed ends and a substantially flat central extent; and an elongate substantially flat planar web having opposed major surfaces, said web including support elements thereon supporting said plurality of wire marker sleeves in a plurality of spaced-apart side-by-side longitudinally extending rows, said web further including an elongate continuous corrugated portion extending between at least two adjacent ones of said side-by-side rows of said wire marker sleeves, said corrugated portion having raised extents which are raised from at least one of said major surfaces of said web.

2. A combination in accordance with claim 1 wherein said support elements include plural pairs of spaced-apart inwardly directed tab members, said tab members of each said pair engaging said opposed ends of one of said plurality of wire marker sleeves thereby supporting said wire marker sleeves on said web.

3. A combination in accordance with claim 1 wherein said web includes plural said corrugated portions and wherein each of said plural corrugated portions is disposed between two adjacent side-by-side rows of said wire marker sleeves.

4. A combination in accordance with claim 1 wherein said corrugated portion is formed integrally with said web.

5. A combination in accordance with claim 2 wherein said tab members are formed integrally with said web.

6. A combination in accordance with claim 1 wherein said opposed ends of each said wire marker sleeve are raised from said at least one major surface of said web a given distance and said raised extents of said corrugated portion are raised a distance substantially equal to said given distance.

7. A combination in accordance with claim 1 wherein said raised extents of said corrugated portion are raised from both of said opposed major surfaces of said web.

* * * * *